United States Patent [19]

Peters

[11] 3,747,494
[45] July 24, 1973

[54] FILM ADVANCE AND METERING MECHANISM FOR CAMERAS

[75] Inventor: Alexander A. Peters, Rochester, N.Y.

[73] Assignee: Eastman Kodak Company, Rochester, N.Y.

[22] Filed: Dec. 1, 1971

[21] Appl. No.: 203,732

[52] U.S. Cl............................ 95/31 AC, 95/31 FM
[51] Int. Cl. .......................................... G03b 19/04
[58] Field of Search .................... 95/31 AC, 31 FL, 95/31 FM

[56] References Cited
UNITED STATES PATENTS

| | | | |
|---|---|---|---|
| 3,512,465 | 5/1970 | Winkler | 95/31 FM |
| 3,148,605 | 9/1964 | Peterson et al. | 95/31 FM |
| 3,580,152 | 5/1971 | Engelsmann | 95/31 FM |
| 3,599,551 | 8/1971 | Lemme | 95/31 FM |
| 3,603,236 | 9/1971 | Engelsmann | 95/31 FL |

Primary Examiner—Samuel S. Matthews
Assistant Examiner—E. M. Bero
Attorney—W. H. J. Kline et al.

[57] ABSTRACT

A camera includes a transport mechanism having a film winding lever which is reciprocally mounted for movement from a rest position for advancing film along an exposure plane. A film sensing pawl is movable between a retracted position on one side of the exposure plane and an extended postion transversing the exposure plane when intercepting a film perforation. The sensing pawl is interconnected with the transport mechanism for disabling the transport means when the sensing pawl is in its extended position. Means interconnecting the film winding lever and the sensing pawl hold the sensing pawl in its retracted position when the lever is in its rest position.

6 Claims, 6 Drawing Figures

PATENTED JUL 24 1973

ALEXANDER A. PETERS
INVENTOR.

BY Milton S. Sales
W.H.J. Kline
ATTORNEYS

PATENTED JUL 24 1973 3,747,494

ALEXANDER A. PETERS
INVENTOR.

BY Milton S. Sales
W.H.J. Kline
ATTORNEYS

FILM ADVANCE AND METERING MECHANISM FOR CAMERAS

CROSS-REFERENCE TO RELATED APPLICATIONS

Reference is made to commonly assigned, copending U.S. Pat. application Ser. No. 203,733, entitled CAMERA, filed in the names of David E. Beach and Jeffrey R. Stoneham on Dec. 1, 1971 and Ser. No. 203,524, entitled FILM METERING MECHANISM FOR CAMERAS filed in the name of David E. Beach on Dec. 1, 1971.

BACKGROUND OF THE INVENTION

1. Field of the Invention

This invention relates to devices for metering perforated film in roll film cameras, and more particularly to such a device adapted to eliminate or reduce the risk of film movement during shutter operation.

2. Description of the Prior Art

Devices for metering successive roll film exposures by arresting the film winding mechanism in response to the sensing of perforations or notches precut in the film at specific intervals are old and well known in the art. Commonly assigned, U.S. Pat. application Ser. No. 203,733, entitled CAMERA, filed on Dec. 1, 1971 in the names of David E. Beach et al. shows a camera film transport mechanism including a sensing pawl which detects the arrival of a perforation at a predetermined location to disable the transport mechanism. A shutter release lever may then be depressed to first withdraw the sensing pawl from the perforation and to then activate the shutter mechanism to take a picture. While cameras having such devices are satisfactory, the operator must depress the shutter release lever with sufficient force to overcome the spring force urging the sensing pawl into the film perforation. This may tend to cause camera unsteadiness resulting in blurred pictures.

To overcome the above-mentioned problem of camera movement resulting from the required excessive force to overcome the spring force on the pawl, coassigned U.S. Pat. application Ser. No. 203,524, entitled FILM METERING MECHANISM FOR CAMERAS, filed in the name of David E. Beach discloses an invention wherein a film sensing pawl is not removed from the perforation by the shutter release lever, but instead remains in the film perforation until after a picture has been taken and the film transport mechanism has begun to advance film. The pawl is resiliently urged against the trailing edge of a perforation by a spring during the exposure period. It has been found that occasionally the pressure on the film from the sensing pawl coupled with vibrations in the camera when a shutter driver is rapidly moved along its path of travel will cause film movement during the exposure interval.

One possible method of eliminating such film movement is to reduce the spring force on the pawl so that there is less tendency for the film to move. However, this may lead to early metering failure due to the fact that when the pawl is removed from the perforation, the spring which has urged the pawl against the trailing edge of the perforation is used to return the pawl to a ready position for detecting the presence of the next succeeding perforation to be advanced along the exposure plane. If the spring force has been reduced, the pawl may not return to its ready position. Therefore, it can be seen that a careful balancing of the spring force is necessary so that the force is insufficient to cause film movement during the picture-taking operation and yet sufficient to return the pawl to its ready position.

SUMMARY OF THE INVENTION

I have found that the problems described above can be eliminated by leaving the pawl in a film perforation only during that period of time when the film is being advanced and by removing the pad from the perforation before the picture-taking operation. This permits the use of a relatively heavy spring for returning the pawl to its ready position without putting undue force on the film during shutter operation, and yet eliminates the need for a large force on the shutter release lever to withdraw the pawl from the perforation during the picture-taking operation.

Therefore, it is an object of the present invention to provide a film advancing and metering mechanism for a camera wherein a film sensing pawl moves into a film perforation to effect metering of the film transport mechanism and is removed from that perforation before operation of the camera's shutter.

In accordance with a preferred embodiment of the present invention, a camera having a film transport and metering mechanism of the type described above includes a gear reciprocally mounted on the housing for movement away from a rest position for advancing film along an exposure plane and a film sensing pawl which is movable between a retracted position on one side of the exposure plane and an extended position transversing the exposure plane when intercepting one of the film perforations. Means are provided interconnecting the film advancing gear and the sensing pawl for moving the pawl to its retracted position in response to return movement of the gear to its rest position.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Because cameras are well known, the present description will be directed in particular to elements forming part of, or cooperating more directly with, apparatus in accordance with the present invention. It is to be understood that camera elements not specifically shown or described may take various forms well known to those skilled in the art.

Figure 1:
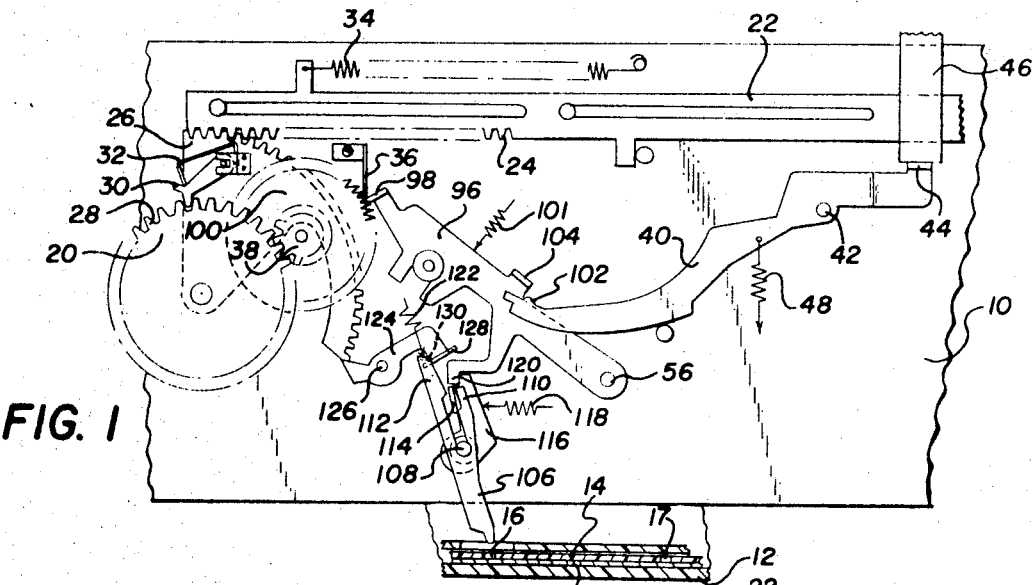
FIG. 1 is a simplified elevational view of a portion of a camera in accordance with the present invention wherein the camera elements are arranged ready to make an exposure.

Referring now to FIG. 1, the camera illustrated as the preferred embodiment includes a housing 10 having a space for receiving a film cartridge, partially shown at 12, containing roll film 14 with perforations 16 and 17 along one edge. The cartridge may be of the type shown in the coassigned U.S. Pat. No. 3,138,081 which issued on June 23, 1964 to Hubert Nerwin, and the film may be backed by paper 18. Such cartridges include a take-up chamber, not shown, wherein film 14 is wound into a roll.

A film wind lever, for example a slide member 22, is reciprocally mounted on housing 10 by a pin-in-slot arrangement. The film wind lever may, of course, be of any well known configuration, such as for example, a rotationally mounted gear or gear sector. Slide member 22 includes a rack wich a plurality of teeth 24 in meshing engagement with the teeth of a gear sector 26 coaxially rotatable with a gear 20. Rotation of gear 20 in a counterclockwise direction as shown in FIG. 1 winds film onto the take-up roll of cartridge 12. Gear 20 has a plurality of teeth 28 in meshing engagement with a ratchet pawl 30 rotatably mounted on gear sector 26. Pawl 30 is biased by a leaf spring 32 into engagement with the teeth of gear 20 so that upon movement of slide member 22 to the left, as viewed in FIG. 1, the rotary movement of gear sector 26 is transmitted to gear 20, thereby winding film into the cartridge's take-up chamber. As slide member 22 is returned to the right by a coil spring 34, gear 20 is prevented from rotating in a clockwise direction by leaf spring 36 which cooperates with the teeth on a ratchet wheel 100 on a gear 38. The teeth of gear 38 are in meshing engagement with teeth 28 of gear 20.

A shutter release lever 40 is pivotally mounted on a stud 42 and includes a tab 44 which may be manually depressed by a body release lever partially shown at 46 to rotate lever 40 in a clockwise direction against the force of a spring 48. Movement of shutter release lever 40 in a clockwise direction trips a high energy lever, not shown, to operate the camera's shutter mechanism for effecting exposure of the portion of film 14 at the camera's exposure plane. Operation of the high energy lever may be found described in either of the aforementioned applications. A metering lever 96 is mounted for rotational movement about a stud 56 and carries a metering pawl 98 urged toward an active position into engagement with the teeth of ratchet 100 by a spring 101 to prevent rotation of gear 38. Metering lever 96 is rotated in a clockwise direction in response to similar rotation of shutter release lever 40 by engagement of a tab 102 on the shutter release lever with a tab 104 on the metering lever.

A film sensing pawl 106 is mounted for rotational and longitudinal movement on a stud 108 on camera housing 10. Sensing pawl 106 has a pair of arms 110 and 112 which define a slot therebetween for receiving a tab 114 of a retainer 116. Retainer 116 is also rotatably carried by stud 108 and is urged in a clockwise direction into abutment with a tab 120 on metering lever 96 by a spring 118. A spring 122 urges sensing pawl 105 toward film 14.

A lifting lever 124 is rotatably carried by a stud 126 on housing 10 and has an abutment 128 which underlies an abutment 130 on arm 112 of sensing pawl 106. The other end of lifting lever 124 lies in the path of gear sector 26.

OPERATION

Figure 2:
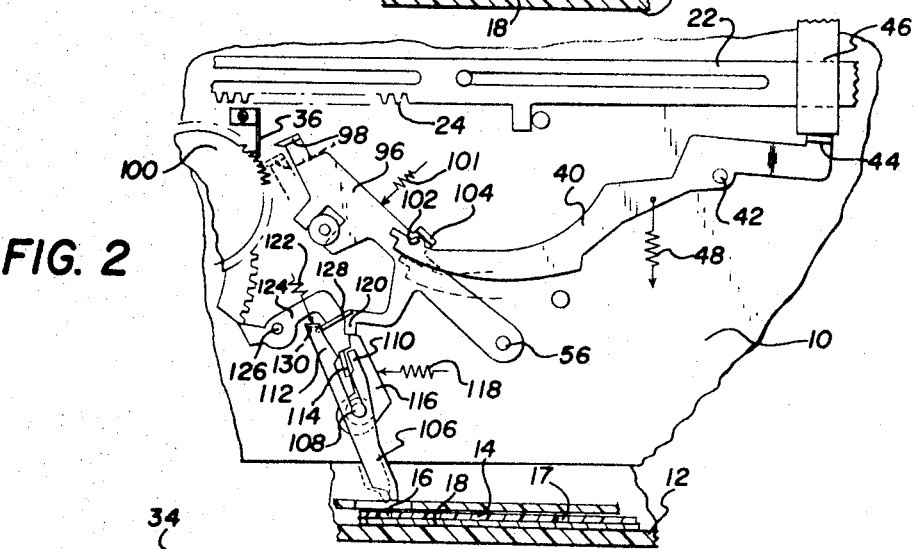
FIGS. 2–6 are elevational views of the camera of FIG. 1 showing five sequential relative positions of the camera elements during operation of the camera.

FIG. 1 shows the elements of the camera in their respective positions after an unexposed frame of film has been wound to the exposure area. The camera is now ready to be operated to take a picture. Metering pawl 98 is in its active position in engagement with ratchet 100 so that film wind lever 22 cannot be moved to the left to transport more film. Referring to FIG. 2, to expose a picture, body release lever 46 is depressed to rotate shutter release lever 40 in a clockwise direction against the force of spring 48. Tab 102 on the shutter release lever contacts tab 104 on metering lever 96 to raise the metering lever from its active, phantom line position to its inactive, full line position shown in FIG. 2. With tab 120 raised, spring 118 acting on retainer 116 is free to rotate film sensing pawl 106 in a counterclockwise direction to its full line position shown in FIG. 2. Tab 120 of the metering lever is now above the top surface of retainer 116 so that metering pawl 98 will not return to ratchet 100 when body release lever 46 is released to allow counterclockwise rotation of shutter release lever 40 to its phantom line position.

Figure 3:
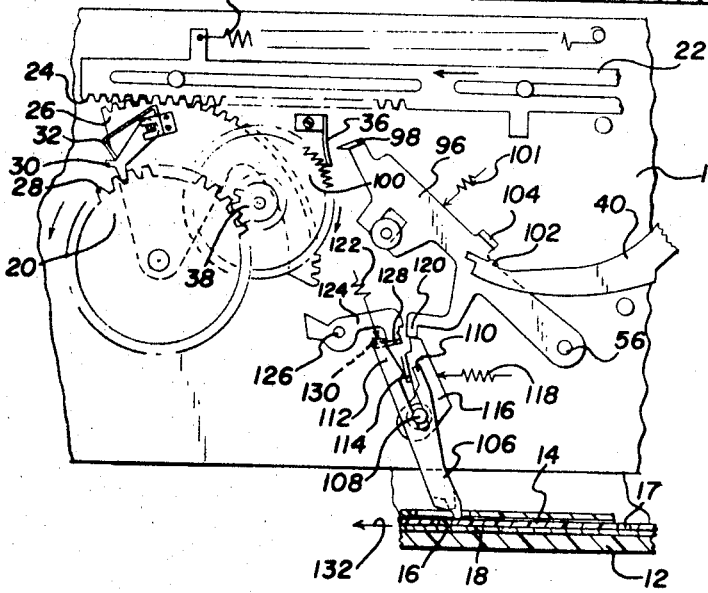

Referring now to FIG. 3, because metering pawl 98 has been disengaged from ratchet 100, film advance lever 22 can now be moved to the left. Such movement rotates gear sector 26 in a counterclockwise direction, causing similar rotation of gear 20 and clockwise rotation of gear 38 and ratchet 100. Rotation of gear 20 causes film to be wound onto cartridge take-up roll. It will be noted that gear sector 26 has been rotated away from contact with lifting arm 124 to allow spring 122 to move film sensing pawl 106 into contact with the film surface.

Figure 4:
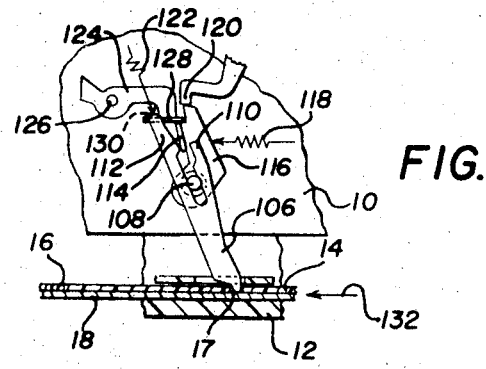
Figure 5:
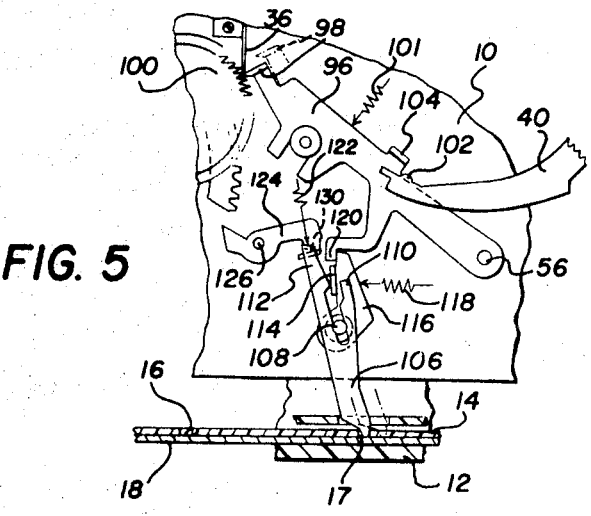
Figure 6:
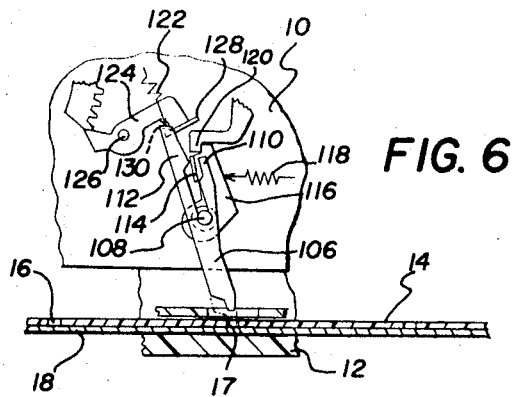

When the next succeeding film perforation 17, advancing in the direction of arrow 132, reaches the position of sensing pawl 106, the pawl drops into the perforation as shown in FIG. 4. The operator continues to move slide 22 to the left so that the trailing edge of perforation 17 causes clockwise rotation of sensing pawl 106 and retainer 116 to remove the top surface of the retainer from below tab 120 of metering lever 96, thereby allowing the metering lever to be moved by spring 101 to its full line position shown in FIG. 5 to deactivate the film winding mechanism and prevent further movement of slide member 22 to the left. The slide member is now moved back to the right by spring 34, and in so moving rotates sector 26 in a clockwise direction until it contacts lifting lever 124 and rotates that lever in a counterclockwise direction to lift film sensing pawl 106 from perforation 17 as shown in FIG. 6. The camera elements are now positioned as shown in FIG. 1 so that an exposure may be made.

Since at the time of an exposure, pawl 106 has been removed from the film perforation by lifting ratchet 124, the force of spring 118 is not transmitted to the film. Otherwise, such force might cause film movement in a rightwardly direction at the time of exposure because there is usually some jarring of the camera when the high energy lever is released.

The invention has been described in detail with particular reference to a preferred embodiment thereof, but it will be understood that variations and modifications can be effected within the spirit and scope of the invention.

I claim:

1. In a camera having (1) a housing including a space for receiving roll film perforated at predetermined metering intervals, (2) means defining an exposure plane, (3) transport means, including a member mounted on said housing for movement away from and back to a rest position, for advancing received film along said exposure plane, (4) film sensing means, movable between a retracted position on one side of said exposure plane and a position transversing said exposure plane and extending through one of the film perforations, for detecting the presence of a perforation at a predetermined position along said exposure plane, and (5) metering means, interconnecting said film sensing means and said transport means, for preventing further film advancement by said transport means when said film sensing means detects the presence of a perforation at said predetermined position; the improvement comprising means interconnecting said member and said film sensing means for returning said film sensing means to its retracted position in response to movement of said member to its rest position.

2. The improvement as defined in claim 1 further comprising spring means for urging said member toward its rest position.

3. The improvement as defined in Claim 2 further comprising spring means for urging said film sensing means away from its retracted position.

4. In a camera having (1) a housing including a space for receiving roll film perforated at predetermined metering intervals, (2) means defining an exposure plane, (3) transport means including a film wind member reciprocally mounted on said housing for movement away from a rest position for advancing received film along said exposure plane, (4) a metering mechanism having an active condition for preventing further film advancement by said transport means and an inactive condition, (5) means for releasably latching said metering mechanism in its inactive condition, (6) means urging said metering mechanism into its active condition, (7) a shutter release lever movable from a first position to a second position for effecting exposure of the film at said exposure plane, and (8) means for placing said metering mechanism in its inactive condition when said shutter release lever is moved to its second position; the improvement comprising:

a film sensing pawl movable between a retracted position on one side of said exposure plane and a position transversing said exposure plane and extending through one of said film perforations to detect the presence of a perforation at a predetermined position;

spring means urging said sensing pawl toward its extended position;

means for releasing said latching means upon movement of said sensing pawl to a predetermining location in its extended position; and means interconnecting said film wind member and said film sensing pawl for moving said pawl to its retracted position when said film wind member is moved to its rest position.

5. In combination with a camera's film advancing mechanism which includes a film wind member movable toward and away from a stationary position, and means for advancing perforated film along an exposure plane when said member is moved away from said stationary position, a film metering mechanism comprising:

a film sensing pawl movable (1) in first and second opposed directions between a retracted position on one side of said exposure plane and a position transversing said exposure plane and extending through a perforation in the film, and (2) in third and fourth opposed directions generally parallel to said exposure plane when said sensing pawl is in its extended position;

spring means urging said sensing pawl in its third direction, said sensing pawl being movable in its fourth direction to a metering position by the trailing edge of a film perforation advancing along said exposure plane;

means interconnecting said sensing pawl and said film advancing mechanism for preventing further film advancement by said film advancing mechanism when said sensing pawl is in its metering position; and means interconnecting said member and said sensing pawl for moving said sensing pawl to its retracted position in response to movement of said member to its stationary position.

6. In a camera having
1. a housing including a space for receiving roll film perforated at predetermined metering intervals,
2. means defining an exposure plane,
3. a film sensing pawl movable between a retracted position on one side of said exposure plane and an extended position transversing said exposure plane and extending through one of the film perforations to detect the presence of a perforation at a predetermined position, and
4. a film advance mechanism including (a) transport means operable for advancing received film along said exposure plane and (b) metering means responsive to the detection of a perforation at said predetermined position by said sensing pawl for pre-venting further film advancement by said transport means; the improvement comprising:
5. means operable for moving said sensing pawl to its retracted position; and
6. means responsive, after the sensing of a film perforation at said predetermined position by said sensing pawl, to a film advance terminating movement of said film advance mechanism for moving said sensing pawl to its retracted position.

* * * * *